United States Patent [19]

Christian et al.

[11] Patent Number: 5,220,399
[45] Date of Patent: Jun. 15, 1993

[54] WIDE ANGLE WHEEL ALIGNMENT SYSTEM

[76] Inventors: Donald J. Christian, 1672 Via Sombrio, Fremont, Calif. 94539; James L. Dale, Jr., 9 Ridgewood; Steven W. Rogers, 831 Nutter Chapel Dr. Apt. G14, both of Conway, Ark. 72032

[21] Appl. No.: 811,504

[22] Filed: Dec. 20, 1991

[51] Int. Cl.$^5$ ............................................. G01B 11/26
[52] U.S. Cl. .................................. 356/152; 356/155; 33/288
[58] Field of Search ................... 356/152, 155; 33/288

[56] References Cited

U.S. PATENT DOCUMENTS

| | | | |
|---|---|---|---|
| 4,302,104 | 11/1981 | Hunter | 356/152 |
| 4,319,838 | 3/1982 | Grossman et al. | 356/152 |
| 4,402,603 | 9/1983 | Lill | 356/152 |
| 4,523,844 | 6/1985 | Titsworth et al. | 356/152 |
| 4,761,749 | 8/1988 | Titsworth et al. | 364/559 |

*Primary Examiner*—Mark Hellner
*Attorney, Agent, or Firm*—H. M. Stanley; R. C. Kamp; R. B. Megley

[57] ABSTRACT

A wheel alignment system is disclosed which measures the angles between the planes of the wheels on the same side, at the front and diagonally opposite on a four wheel vehicle. The measurements are processed to provide wheel toe, relative wheel plane orientation, front wheel offset and front and rear wheel setback relative to the vehicle frame to assist in damage assessment.

53 Claims, 5 Drawing Sheets

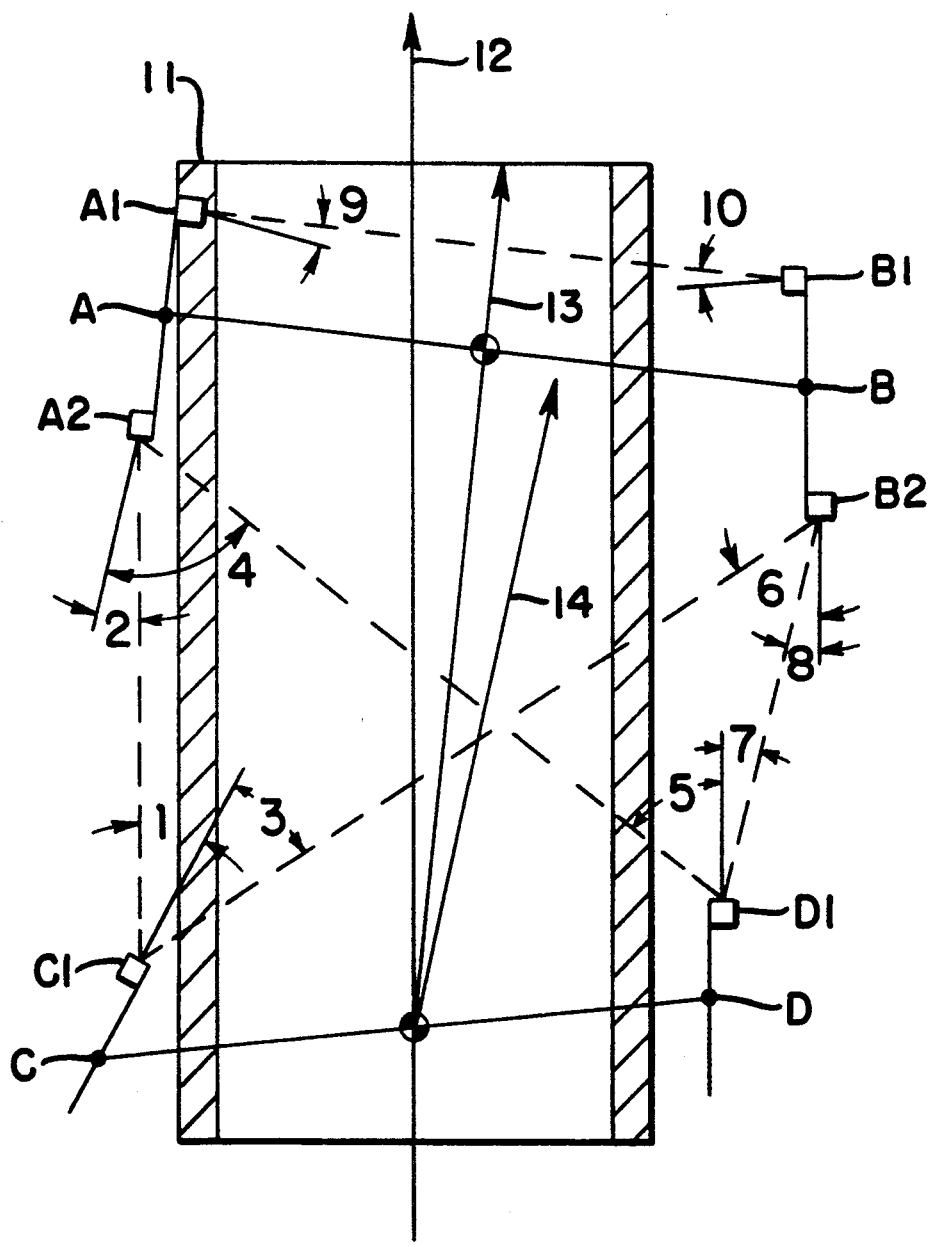
FIG_1

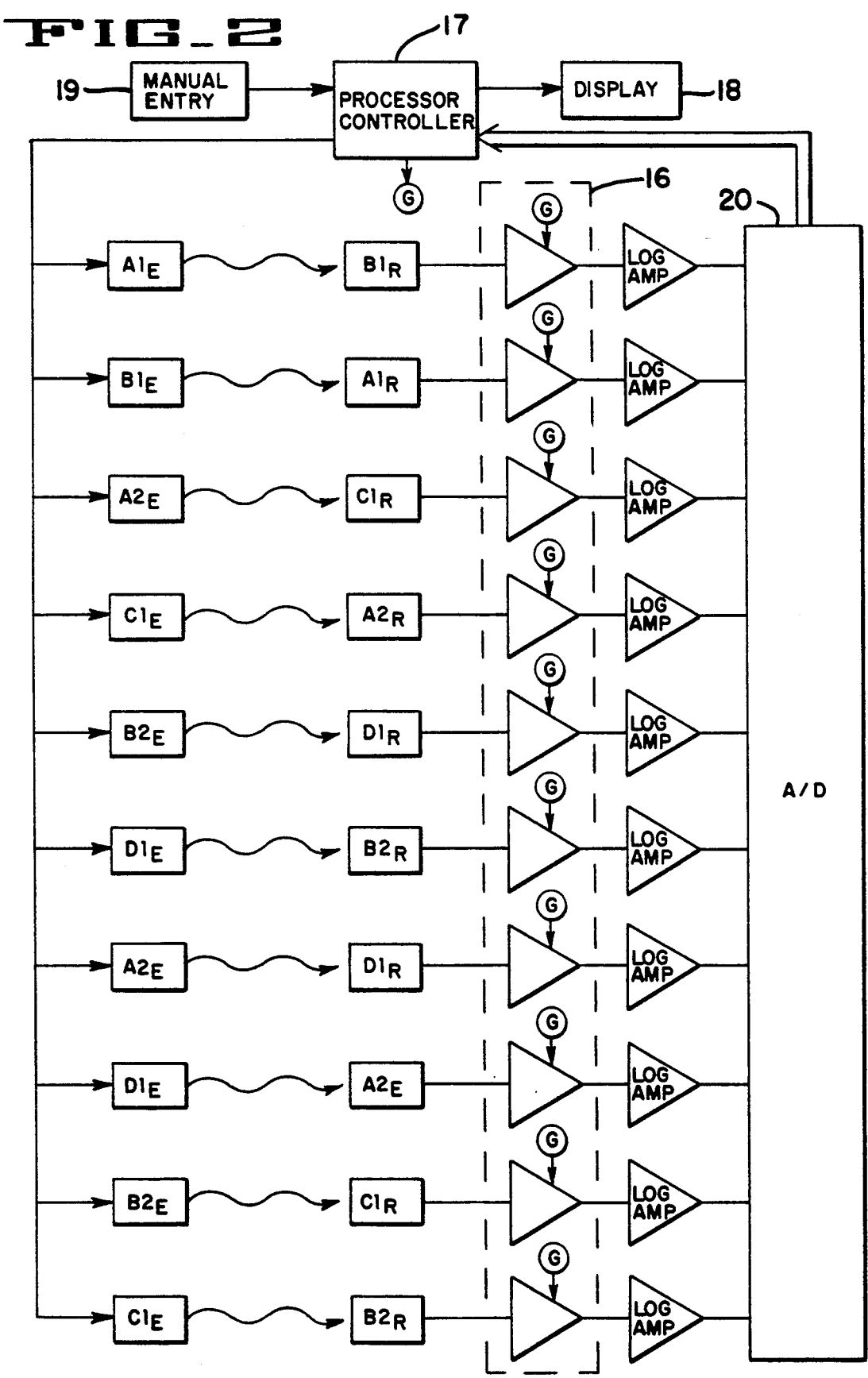

FIG_3
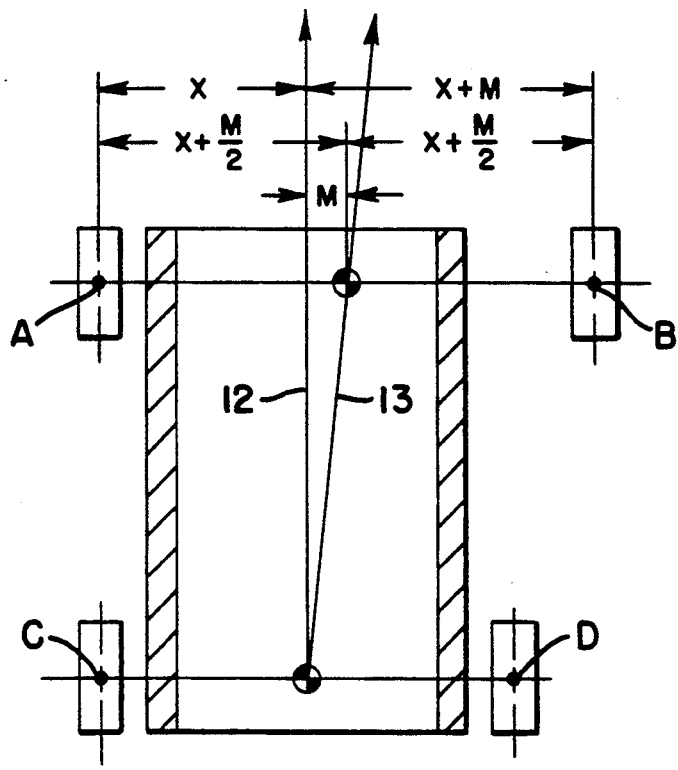
FIG_4
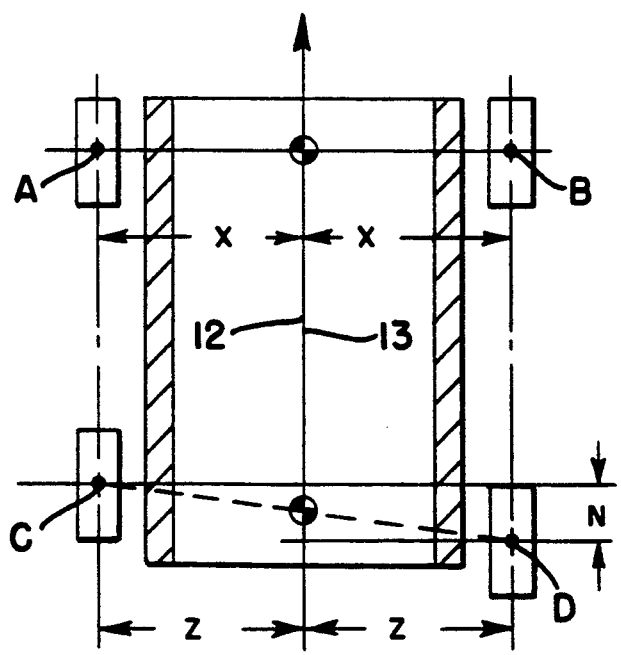

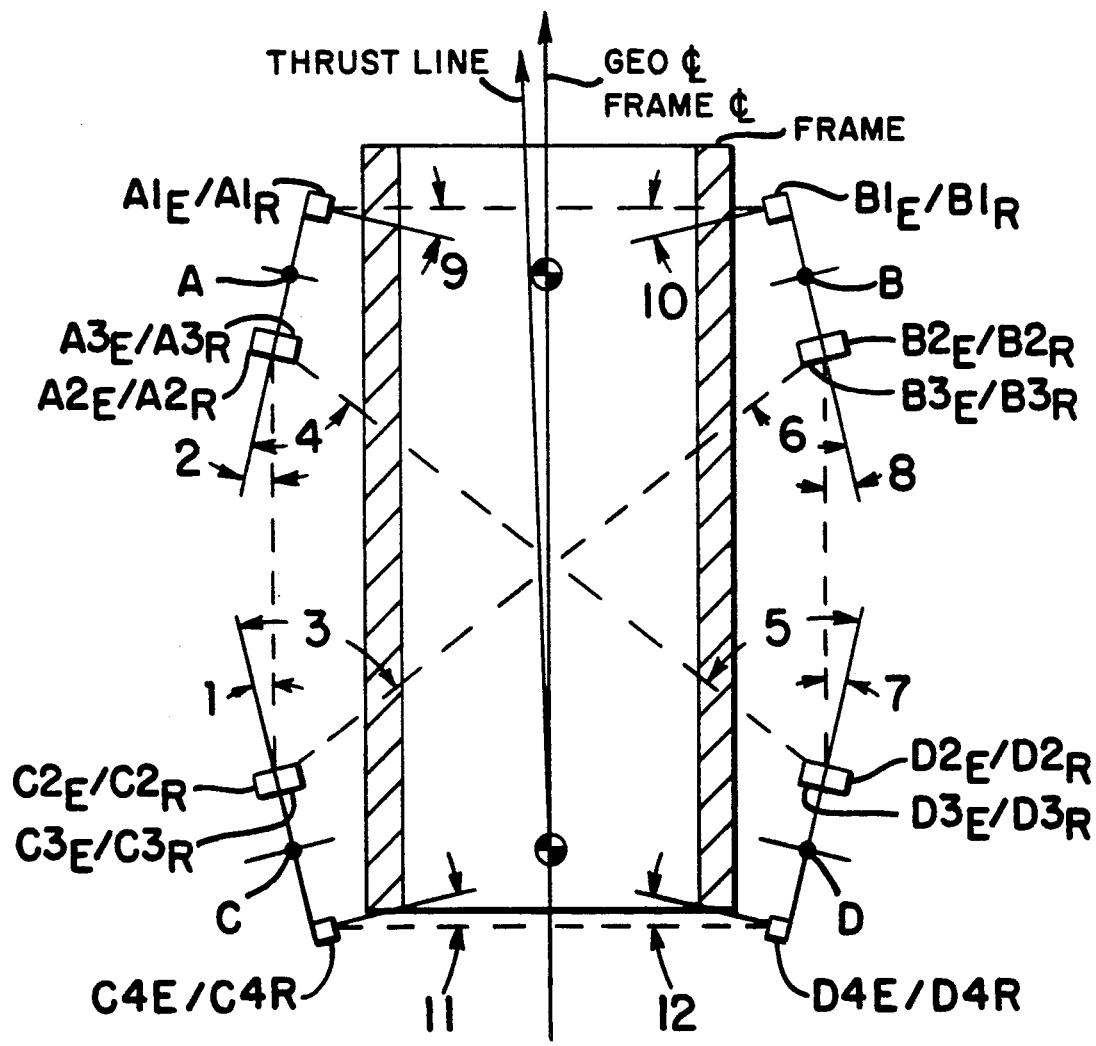

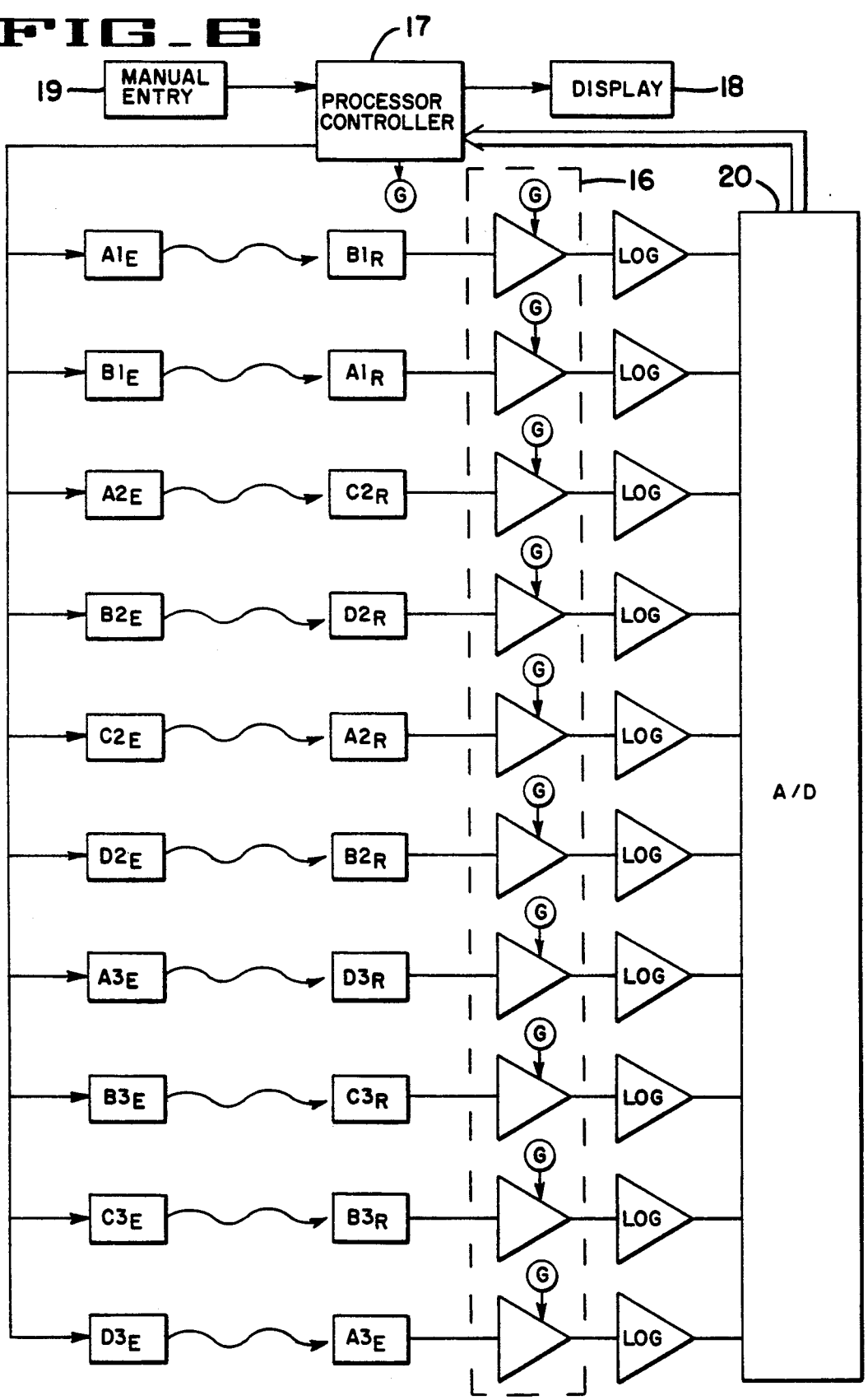

WIDE ANGLE WHEEL ALIGNMENT SYSTEM

SUMMARY OF THE INVENTION

The present invention relates to a wheel position measurement system for a vehicle having a support structure and at least two pairs of supporting wheels which includes angle measurement means mounted on the supporting wheel pairs in known angular relation to the plane of the supporting wheels for providing measured angle outputs relating thereto. Also included is means for directing the angle measurement means to provide discrete measurements for the angles between the planes of predetermined ones of diagonally opposite, opposite, and same side wheels of the at least two wheel pairs. Means is further included for receiving the measured angle outputs and for providing output indicative of the position of the wheels relative to the frame.

In another aspect of the invention a wheel position measurement system is disclosed for a vehicle having at least two pairs of laterally spaced supporting wheels which includes angle measuring means mounted on each supporting wheel in known position relative to the plane of the wheel for providing measured angle outputs relating thereto, means for controlling the angle measurement means to provide measurements for the angles between the planes of predetermined wheels on opposite sides, the same side and diagonally opposite sides of the vehicle, and means for receiving the angle measurements and for providing output indicative of the relative orientations and positions of the wheels.

In yet another aspect of the invention a wheel alignment measurement apparatus is disclosed for a vehicle having left and right front and left and right rear wheels having nominal wheel planes subject to alignment including first means for measuring the angle between the planes of the left front and right rear wheels and second means for measuring the angle between the planes of the right front and left rear wheels. Further, the invention includes third means for measuring the angle between the planes of the left front and right front wheels, fourth means for measuring the angle between the planes of the left front and left rear wheels, fifth means for measuring the angle between the planes of the right front and right rear wheels, and processor means for receiving angle measurements from said first, second, third, fourth, and fifth means for measuring and for providing output indicative of the relative positions of the left and right front and left and right rear wheels.

Further, the disclosed invention relates to apparatus for measuring the relative angular orientations and locations between the planes of supporting wheels on a four wheel vehicle which includes beam emitter means mounted on each supporting wheel for directing a beam therefrom toward one same side and one diagonally opposite wheel, beam receiver means mounted on each supporting wheel in known orientation therewith for receiving the beam from one same side and one diagonally opposite wheel mounted beam emitter and for providing angle output indicative of angle between the beam receiver mounting wheel and each received beam. Additionally, cross beam emitter means is included mounted on each of two laterally opposed wheels, and cross beam receiver means is mounted on each of the two laterally opposed wheels in known orientation therewith for receiving the cross beam from the laterally opposed wheel mounted cross beam emitter and for providing angle output indicative of angle between the cross beam receiver mounting wheel and the received cross beam. Further, means is provided for processing the angle outputs and for providing angular orientation and location data.

The invention also relates to a method of determining the relative orientation and location of supporting wheels on a four wheel vehicle which includes the steps of measuring the angle between the planes of diagonally opposite pairs of wheels, measuring the angle between the planes of longitudinally opposed pairs of wheels, measuring the angle between the planes of one laterally opposed pair of wheels, and calculating the relative orientation and location of the four wheels from the measured angles.

BRIEF DESCRIPTION OF THE DRAWINGS

FIG. 1 is a diagrammatic plan view of a four wheel vehicle showing installation of one embodiment of the present invention.

FIG. 2 is a block diagram representing the embodiment depicted in FIG. 1.

FIG. 3 is a diagrammatic plan view of a vehicle illustrating front wheel offset.

FIG. 4 is a diagrammatic plan view of a vehicle illustrating rear wheel set back.

FIG. 5 is a diagrammatic plan view of a four wheel vehicle showing installation of another embodiment of the present invention.

FIG. 6 is a block diagram depicting the system shown in FIG. 5.

DESCRIPTION OF THE PREFERRED EMBODIMENTS

Referring to FIG. 1 of the drawings a vehicle frame 11 is shown having a centerline 12 extending longitudinally thereof with a forward end indicated by the arrow on the centerline. The vehicle frame 11 is shown in FIG. 1 supported by four vehicle wheels, including a front wheel pair A and B and a rear wheel pair C and D. The planes of the four wheels are represented by the straight lines extending through points A, B, C and D. Wheel pairs A/B and C/D are called opposite side wheels. Wheel pairs A/C and B/D are called same side wheels. Wheel pairs A/D and C/B are called diagonally opposite wheels. A geometric centerline 13 is represented for the set of wheels which extends through the center points between the front wheel pair A and B and the rear wheel pair C and D. The geometric centerline 13 is shown displaced angularly from the frame centerline 12 in an exaggerated fashion in FIG. 1 for purposes of illustration. A thrust line 14 for the vehicle of FIG. 1 is shown extending from the center point between the rear wheels C and D. As is known to those of skill in this art, the thrust line is the bisector of the angle between the planes of the two rear wheels C and D of a vehicle and defines the tracking direction for the vehicle. It is clear that the vehicle illustrated in FIG. 1 is badly misaligned. The purpose is to clearly illustrate supporting wheel offset/setback misalignment conditions to describe and define those conditions. A front wheel offset condition is defined as the distance between the frame centerline 12 and the center point between the front wheels A and B through which the geometric centerline 13 runs. Front wheel set back is seen in FIG. 1 as the distance in the direction of the frame centerline 12 between the two spin axes of the front wheels A and B. Rear wheel set back, in similar fashion, is defined as the distance in the direction of the frame centerline 12 between the two spin axes of the rear wheels C and D. These conditions will be investigated in more detail in discussions relating to FIGS. 3 and 4. Some of the advantages obtained by the alignment system disclosed herein relate to ready measurement of offset and set back for the purpose of assessing damage to a vehicle or for making corrections to the relative positions between the support wheels of a vehicle if the vehicle supporting structure has undergone collision damage.

It should be noted here that the apparatus and method disclosed herein relates to alignment of vehicle supporting wheels relative to each other both in orientation and position. The assumption is made that the frame is supported on the vehicle wheels reasonably equidistant laterally relative to the wheel pairs.

Continuing with reference to FIG. 1 it may be seen that there is an emitter and detector pair at A1 mounted on the left front wheel A and directed generally across the front of the vehicle represented by the wheel supported frame 11. There is an emitter and detector pair represented by B1 mounted on the right front wheel of B which is directed generally across the front of the vehicle represented by the wheel supported frame 11. A reference direction is represented by the solid lines emanating from A1 and B1 wherein the reference line is generally perpendicular to the plane of the wheels A and B respectively. The emitter A1E projects a fan shaped or somewhat spread out beam which includes the beam component represented by the dashed line extending between A1 and B1 which impinges the detector B1R at an angle represented by the numeral 10 relative to the perpendicular reference from the plane of wheel B. In like fashion the emitted beam from the emitter B1E has a beam component extending along the same dashed line to impinge upon the detector A1R mounted on wheel A providing definition of an angle relative to the perpendicular to the wheel plane of wheel A indicated by the numeral 9 in FIG. 1. In this and ensuing comments relating to the combination of angles for determination of angles between the wheel planes it will be assumed that the reader is familiar with the convention in this art relating to positive and negative angles relative to a reference direction either parallel to or perpendicular to the wheel planes. Therefore, angles between wheel planes will be expressed as differences, recognizing that such angles may in fact be sums of absolute angle values. Thus, the angle between the perpendiculars to the planes of wheels A and B is represented by angle 9 minus angle 10 recognizing that one of the angles 9 and 10 is negative, so the difference is the sum of the absolute values of the angles. An emitter satisfactory for the function described herein is a light emitting diode such as RCA type SG1004. An appropriate detector for the invention described herein is a position sensing detector such as a type L30 manufactured by SiTek Electro Optics, Sweden, which is marketed in the U.S.A. by EG and G Foton Devices, Salem, Mass.

FIG. 1 also shows an emitter/detector pair at A2 which will be designated $A2_E$ and $A2_R$. In like fashion there is at position B2 at the rear of wheel B an emitter $B2_E$ and a detector $B2_R$. At position C1 in FIG. 1 mounted on wheel C, there is an emitter $C1_E$ and a detector $C1_R$. At position D1 mounted on wheel D there is likewise an emitter $D1_E$ and a detector $D1_R$. The emitter $A2_E$ is received by the detector $D1_R$ which defines the angle 5 between the plane of the wheel D and the received beam emanating from $A2_E$ shown by the dashed line. Similarly the emitter $D1_E$ projects a beam along the same dashed line to be detected by the detector $A2_R$ which defines an angle 4 between the received beam and the plane of wheel A. The angle between the plane of wheel A and wheel D is therefore angle 4 minus angle 5.

The emitter $B2_E$ in FIG. 1 projects a beam shown by dashed line toward detector $C1_R$. $C1_R$ then defines the angle 3 between the plane of wheel C and the beam projected by $B2_E$. The emitter $C1_E$ projects a beam along the same dashed line to be received by detector $B2_R$ which then defines the angle 6 between the plane of wheel B and the beam projected by $C1_E$. The angle therefore between the planes of wheels C and B is angle 6 minus angle 3. The emitter $A2_E$ also projects a beam along the dashed line toward detector $C1_R$ which defines the angle 1 between the plane of wheel C and the projected beam. Emitter $C1_E$ projects a beam along the same dashed line to be received by detector $A2_R$ which then defines the angle 2 between the plane of wheel A and the beam projected by emitter $C1_E$. The angle between the planes of wheels A and C may therefore be seen to be angle 2 minus angle 1.

Emitter $B2_E$ projects a beam along the dashed line extending to detector $D1_R$ which then defines the angle 7 between the plane of wheel D and the received beam. In similar fashion the emitter $D1_E$ projects a beam along the same line toward the detector $B2_R$ which in turn defines the angle 8 between the received beam and the plane of wheel B. The angle between the planes of wheels B and D may therefore be seen to be angle 7 minus angle 8.

It should be noted here that the actual positions of the emitters and detectors along the planes of the wheels on which they are mounted are not restricted to those shown in FIG. 1 as long as the other criteria recited herein are met. For example, the emitter and detector pairs at A1 and B1 could be mounted at the approximate positions of detector pairs A2 and B2 as long as A1 and B1 could communicate.

The angle data provided by the detectors mentioned hereinbefore is coupled to variable gain amplifiers shown generally at 16 in FIG. 2. A processor/controller 17 is shown in FIG. 2 which provides an automatic gain control shown at G. The function of the processor/controller 17 is performed by a microprocessor such as Motorola type 68HC11.

In FIG. 2 there are six emitters and 6 detectors. Ten emitter and detector boxes are shown because four of the detectors function with two different emitters each as previously described. For clarity therefore it is shown in FIG. 2 that detector $D1_R$ for example receives the projected beam from emitter $B2_E$ and emitter $A2_E$ so that it may define both angle 7 and angle 5 of FIG. 1. For proper identification and to prevent cross talk between the projected beams and detectors the processor/controller 17 time multiplexes the emitters so that no two emitter detector pairs are ever active at the same time. As a result, when emitter $B2_E$ is energized and only angle 3 in FIG. 1 is to be measured, only detector $C1_R$ is enabled to receive a projected beam. Since the processor knows the emitter $B2_E$ is projecting, and detector $C1_R$ is scheduled to receive, the processor then knows that the data obtained represents angle 3.

The angle output signal from the detector of FIG. 2 are coupled to variable gain amplifiers at 16 as shown. The timing of the emitter on/off cycle is established by the controller. The gain of the detector ($C1_R$ in the immediately preceding example) is increased during the emitter (emitter $B2_E$ in the immediately preceding example) "on" phase until either the signal is detected or the maximum gain of the variable gain amplifier is reached. If no signal is detected at maximum gain, either the wheel base is too long or the track width is too wide to be accommodated by the system or there is an error. Error possibilities include improper mounting of the heads on the vehicle wheels, an obstacle inserted between the emitter and receiving detector, dirt on optical lenses in the system or some other equipment fault. The variable gain amplifier will bring the detected system to a useable level for the system, thereby compensating for lower emitter beam power levels received at the detectors due to longer projection distances for wide track width or long wheel base vehicles.

The signal output from the variable gain amplifier 16 is input to a logarithmic amplifier which provides a log scaled output connected to an analog to digital (A/D) converter 20. The digitized angle output at useable level and in logarithmic format has increased angle resolution near the center of the angular range or at small measured angle values. To correct for the logarithmic distortion introduced by the log amplifier, the processor contains a "look-up" table prepared with an inverse logarithmic function which linearizes the angle output values. The linearized values are provided to a display 18 where programmed wheel alignment values are displayed or where specific wheel alignment values may be called up by means of a manual entry or keyboard 19. The display may be a CRT. The manual entry or keyboard 19 may also be used to enter known track width dimensions or wheel base dimensions for a vehicle being aligned so that quantitative wheel positions may be calculated by the processor/controller 17. Alternatively, the processor/controller 17 may have a list of vehicle wheel spacing dimensions which may be called by an operator when a particular vehicle is subjected to alignment by the system disclosed herein.

With reference to the foregoing, it may be seen that the emitters and detectors are mounted in alignment heads which are precision mounted on the wheels to be aligned. The precision affords known relationship between the detectors and the planes of the wheels upon which the heads are mounted. A pair of alignment heads measures two angles at the pair of wheels upon which the heads are mounted. The two angles are the angle at each head between the plane of the wheel on which the head is mounted and the projected light beam which connects the heads. The angle is measured by the detector which is the primary instrument of measurement.

FIG. 3 is a simplified diagram to illustrate more clearly front wheel offset. As may be seen in the Figure the frame centerline 12 and the geometric centerline 13 do not coincide. The centerlines do not coincide because the front wheels A and B are not positioned symmetrically with the rear wheels C and D. The center point between the front wheels A and B may be seen to be offset by a distance M from the frame centerline. The front wheel offset is therefore a distance M as shown.

With reference now to FIG. 4, a simplified diagram is shown to illustrate rear wheel setback. Front wheel setback may be illustrated similarly, as seen in FIG. 1, but no front wheel setback is shown in FIG. 4. The frame centerline 12 and geometric centerline 13 coincide in FIG. 4 as there is no front wheel offset. However, the left rear wheel C is positioned forward of the right rear wheel D as shown. As a result, rear wheel setback in the amount equivalent to the dimension N exists in the supporting wheels shown in the diagram of FIG. 4.

Because there are fewer symbols associated with FIGS. 3 and 4 a brief explanation of the manner in which the angles determined by the disclosed system provide wheel toe, front wheel offset and front and rear wheel setback will be undertaken with reference to those figures. Two triangles are defined by the measurements of the disclosed system which are triangles ABC and BAD. The two triangles have a common side AB. All three angles of each triangle are known as described hereinbefore. Therefore, with reference to the frame centerline, front wheel offset and front or rear wheel setback may be determined as well as the toe for each of the four wheels. It may be desirable to know these wheel position characteristics relative to the frame centerline for the purpose of assessing damage to the frame. There may be reason for relating the wheel positions to other reference directions such as the geometric centerline 13 or the thrust line 14 shown in FIG. 1. If one of the wheel position dimensions is known, such as the track width (2X in FIG. 4) or the wheel base (such as the distance from A to C in FIG. 3), then all other dimensions may be computed from the two aforementioned triangles with known angles and one known side. Alternatively, a wheel base or track width may be assumed or entered through the manual entry or keyboard 19 or obtained from a list stored in the processor/controller 17 upon indication of an appropriate model number through the manual entry 19.

The embodiment of FIG. 5 is similar to the embodiment of FIG. 1 except that 10 emitter/detector pairs are used instead of 6. Dedicated emitter detector pairs are provided in the alignment heads mounted on wheels A, B, C and D for projection diagonally across the vehicle. Emitter $A3_E$ projects a beam from left front wheel A toward right rear wheel D so that angle 5 is measured between the plane of wheel D and the projected beam. Emitter $D3_E$ projects a beam diagonally across the vehicle on the same line toward left front wheel A from right rear wheel D to be received by detector $A3_R$ to thereby define the angle between the plane of wheel A and the received beam designated as angle 4. Similarly, emitter $B3_E$ projects a beam diagonally across the car from right front wheel B toward left rear wheel C to be received by detector $C3_R$ to thereby define angle 3 between the plane of left rear wheel C and the received beam. Emitter $C3_E$ projects a beam from left rear wheel C along the same line to be received at right front wheel B by emitter $B3_R$ to define the angle 6 between the received beam and the plane of wheel B. The other angles 1, 2, 7, 8, 9 and 10 are obtained in the same fashion as described in conjunction with FIG. 1 hereinbefore.

As stated hereinbefore with respect to FIG. 1 the positions of the emitters and detectors along the plane of the mounting wheels are not restricted to those shown in FIG. 5 as long as the other criteria herein are met and the paths between cooperating emitters and detectors remain open.

It should be noted with regard to FIG. 5 that the emitters and detectors utilized in measurements of angles diagonally across the vehicle may be replaced by taut bands extending between electromechanical or opto-mechanical angle measuring instruments mounted on diagonally positioned wheels at the ends of the taut bands. Therefore an angle measuring instrument may be mounted on the left front wheel A in place of emitter/detector $A3_E/A3_R$ and similar angle measuring instruments may be mounted on right rear wheel D in place of emitter/detector $D3_E/D3_R$ and a taut band extended therebetween on the dashed line shown. Similarly an angle measuring instrument may be mounted in place of emitter/detector $C3_E/C3_R$ on the left rear wheel C and in place of emitter/detector $B3_E/B3_R$ on the right front wheel B with a taut band extending therebetween represented by the shown dashed line between $C3_E/C3_R$ and $B3_E/B3_R$. The remainder of the angle sensors may also be electromechanical or optomechanical angle sensors such as rotary pots or may remain as electro-optical angular measurement devices described herein.

In the embodiment of FIG. 5 wherein all angular sensors are electro-optical angle sensors as described hereinbefore, the block diagram of FIG. 6 applies. As seen therein and as distinct from the block diagram of FIG. 2 in the embodiment of FIG. 1, there are ten discrete detectors as opposed to the four double duty detectors described in conjunction with the embodiment of FIGS. 1 and 2. Otherwise the embodiment of FIG. 6 functions as described for the embodiment of FIG. 2 wherein the processor controller 17 controls the on/off sequence of the emitters shown for example by $A1_E$. The detectors, shown for example by $B1_R$, produce an output which is coupled to the variable gain amplifier 16 for the purposes described hereinbefore in conjunction with the embodiment of FIG. 2. The output of the variable gain amplifier is coupled to the logarithmic amplifier as shown in FIG. 6 which is then digitized in the analog/digital converter 20. The processor controller 17 selects the $B1_R$ output during the on time of the emitter $A1_E$, in this example, as a measurement of the angle 10 in FIG. 5. In similar fashion the processor/controller 17 sequentially turns on the remainder of the emitters, receives the logarithmic form of the corresponding detector and subjects the received angle output signal to an inverse log function to linearize the angle output which is provided, for use by an operator for example, to the display 18 which may be a CRT. As suggested in conjunction with the embodiment of FIGS. 1 and 2, vehicle wheel dimensional spacing characteristics may be entered into the processor/controller 17 for the purpose of obtaining quantitative indications of the wheel positions relative to a predetermined reference such as the frame centerline 12. Thus, individual wheel toe as well as wheel position characteristics such as offset and setback may be obtained for purposes of wheel alignment and vehicle damage assessment.

FIG. 5 is used to illustrate a redundant pair of sensors (twelve total emitter/detector pairs) and the manner in which they may be used to provide a cross check for angle measurement accuracy acceptability. The system of FIG. 1 is also able to be modified to include the emitter detector pairs C4E/C4R and D4E/D4R (eight total emitter/detector pairs) to obtain the same cross check capabilities to be described for the system of FIG. 5. The emitter C4E and detector D4R function to measure angle 12 of FIG. 5 and the emitter D4E and detector C4R function to measure the angle 11 as hereinbefore described for the other emitters and detectors to obtain measurement of the other angles in FIG. 5.

The method of obtaining a check measurement is to obtain enough measurements to determine a wheel orientation characteristic through calculation and then measure the calculated orientation characteristic directly. A comparison of calculated and directly measured quantities provides indication of whether the calculated quantity (from measured angles) is within acceptable error values. For example, front cross toe, left track toe and right track toe may be used to calculate total rear toe, as is known to those in this art. Total rear toe may also be measured by the sensors measuring angles 11 and 12. A comparison provides the cross check.

As used herein the term "emitter/detector pair" has been applied to an emitter and detector mounted on the same wheel and disposed to project a light beam from the emitter of the pair toward another wheel for measurement of angle between the beam and the plane of the other wheel, as well as to receive a light beam at the detector of the pair from the other wheel to provide measurement of the angle between the received beam and the plane of the wheel on which the emitter/detector pair is mounted. This explanation is offered to provide distinction over the term "cooperating emitter/detector pair" which relates to an emitter of a cooperating pair mounted on one wheel which projects a light beam toward a detector of a cooperating pair mounted on another wheel, whereby the angle between the plane of the other wheel and the projected light beam is sensed by the detector. In the sense of cooperating emitter detector pairs there are twelve such pairs in the embodiment of FIG. 1 if emitter detector pairs corresponding to C4E/C4R and D4E/D4R of FIG. 5 are added to provide cooperating emitter/detector pairs C4E/D4R and D4E/C4R. In like fashion the embodiment of FIG. 5 contains twelve cooperating emitter detector pairs. Each of these cooperating pairs measures an angle between the cooperating emitter light beam and the plane of the wheel on which the cooperating detector is mounted resulting in twelve measured angles. Two such cooperating pairs mounted appropriately on the same two wheels provide angle measurement data between the two wheel planes. It may then be said that there is measuring apparatus and method disclosed herein to provide for the determination of the interwheel angle between the planes of six wheel pairs, namely, in terms of FIGS. 1 and 5, wheels A and B, A and C, A and D, B and C, B and D, and D and C. As a result, measurement of any five interwheel angles will provide toe information for all four wheels. Measurement of the sixth interwheel angle provides redundant information which may be used to obtain a check calculation for the toe information obtained from the five interwheel angles. Additionally, if circumstances prevent one of the six interwheel angle measurements, the remaining interwheel angle data, as mentioned before, is sufficient to provide four wheel toe information.

The positions of the wheels may also be checked with the incorporation of the extra pair of emitter/detector pairs. For example, when angles 1 through 10 are measured, triangle shapes ABC and ABD are defined. Length AB, for example, may be set to 1.00. The relative lengths of AC, BD, AD and BC may then be calculated. The angle of one leg, AC for example, may be assigned a direction of zero degrees. The coordinates of a point A, for example, may be assigned to values 0,0. The coordinates of points B, C and D may then be calculated relative thereto using the known angles and geometric principles. This establishes wheel positions with or without the additional pairs of emitter/detectors C4E/C4R and D4E/D4R of FIG. 5. However, using the additional rear cross toe sensors and deleting any one of the first used angle pairs, front cross toe for example, triangle shapes ACD and BCD may be defined. Using one of the lengths calculated in the first part of this approach, AC for example, the lengths (relative) of sides CD, AD, BD and BC may be computed. (CD is the common side.) Set point A at 0,0 coordinates. Set the angle of side AC at zero degrees. Calculate the relative positions of points B, C and D (the wheels). Compare the position results from the first and second calculations. The position values must be within acceptable error limits.

With the disclosed system, toe out on turns may be measured with the toe system rather than with mechanical or electromechanical turn tables for the front wheels of a vehicle. A continuous unique signal representative of toe for all supporting wheels of a vehicle is obtained over wide wheel angles. It should be noted that the vehicle alignment heads may be configured so that the emitters may project beams underneath the vehicle to be received by detectors diagonally or laterally across the vehicle. In similar fashion, when electromechanical angle measurement means such as rotary potentiometers are used for angle measurement, the taut band connecting the electromechanical angle measurement means may extend diagonally or laterally underneath the vehicle.

Although the best mode contemplated for carrying out the present invention has been herein shown and described, it will be apparent that modification and variation may be made without departing from what is regarded to be the subject matter of the invention.

What is claimed is:

1. A wheel position measurement system for a vehicle having supporting structure and at least two pairs of supporting wheels, comprising
    angle measurement means mounted on the supporting wheel pairs in known angular relation to the plane of said supporting wheels for providing measured angle outputs relating thereto,
    means for directing said angle measurement means to communicate directly between predetermined ones of said angle measurement means mounted on pairs of diagonally opposite, opposite, and same side wheels of the at least two wheel pairs and to provide discrete measurements of the angles between the planes of said pairs of wheels, and
    means for receiving said measured angle outputs and for providing output indicative of the relative orientations and positions of said wheels.

2. A wheel position measurement system as in claim 1 wherein the at least two pairs of supporting wheels are a pair of front wheels and a pair of rear wheels, and wherein said means for directing comprises
    means for directing said angle measurement means to measure the angles between one front wheel and the diagonally opposite rear wheel, the other front wheel and the diagonally opposite rear wheel, the two front wheels, the front and rear wheels on one side and the front and rear wheels on the other side.

3. A wheel position measurement system as in claim 1 wherein said angle measurement means comprises an optical beam projector on one wheel and an optical beam receiver on another wheel, further comprising means for supporting said angle measurement means to project said optical beam under the vehicle to said optical beam receiver on said diagonally opposite wheel.

4. A wheel position measurement system as in claim 1 comprising means coupled to said means for receiving, for entering track width of the vehicle therein, whereby quantitative relative wheel positions are determined.

5. A wheel position measurement system as in claim 1 comprising means coupled to said means for receiving for entering wheel base data therein, whereby quantitative relative wheel positions are determined.

6. A wheel position measurement system as in claim 1 wherein said angle measurement means comprises an optical beam projector on one wheel and an optical beam receiver on another wheel, further comprising variable gain amplifying means for receiving said measured angle output, said means for providing output indicative of wheel position comprising means for controlling said variable gain amplifying means to produce predetermined output therefrom without regard to variations in track widths and wheel bases between different vehicles.

7. A wheel position measurement system as in claim 1 wherein said angle measurement means comprises angle transducers and string means connecting said angle transducers between said predetermined ones of the wheel pairs.

8. A wheel position measurement system as in claim 1 comprising means for conditioning said measured angle output to enhance angular resolution at smaller measured angles.

9. A wheel position measurement system as in claim 8, wherein said means for conditioning comprises a logarithmic amplifier for receiving said measured angle output and for providing increased resolution near the center of the angular range and said means for receiving comprises inverse logarithmic means receiving said logarithmic amplifier output, whereby linearized measured angle output is obtained.

10. A wheel position measurement system as in claim 1 wherein said means for directing comprises means for requiring discrete angle measurements between the planes of both pairs of diagonally opposite wheels, both pairs of same side wheels and both pairs of opposite wheel, whereby any particular calculated toe angle may be calculated using different sets of measured angles.

11. A wheel position measurement system for a vehicle having at least two pairs of laterally spaced supporting wheels, comprising
    angle measurement means mounted on each supporting wheel in known position relative to the plane of said wheel for providing measured angle outputs relating thereto,
    means for controlling said angle measurement means to communicate directly between ones thereof mounted on pairs of opposite side, same side and diagonally opposite side wheels and to provide measurements for the angles between the planes of predetermined wheels on opposite sides, the same side and diagonally opposite sides of the vehicle, and
    means for receiving said angle measurements and for providing output indicative of the relative positions of said wheels.

12. A wheel position measurement system as in claim 11 wherein the at least two pairs of supporting wheels are a pair of front wheels and a pair of rear wheels, and wherein said means for controlling comprises
    means for directing said angle measurement means to measure the angles between one front wheel and the diagonally opposite rear wheel, the other front wheel and the diagonally opposite rear wheel, the two front wheels, the front and rear wheels on one side and the front and rear wheels on the other side.

13. A wheel position measurement system as in claim 11 wherein said angle measurement means comprises an optical beam projector on one wheel and an optical beam receiver on another wheel, further comprising means for supporting said angle measurement means to project said optical beam under the vehicle to said optical beam receiver on said diagonally opposite wheel.

14. A wheel position measurement system as in claim 11 comprising means coupled to said means for receiving for entering track width data of the vehicle therein, whereby quantitative relative wheel positions are determined.

15. A wheel position measurement system as in claim 11 comprising means coupled to said means for receiving for entering wheel base data of the vehicle therein, whereby quantitative relative wheel positions are determined.

16. A wheel position measurement system as in claim 11 wherein said angle measurement means comprises an optical beam projector on one wheel and an optical beam receiver on another wheel, further comprising variable gain amplifying means for receiving said measured angle output, said means for providing output indicative of wheel position comprising means for controlling said variable gain amplifying means to produce predetermined output therefrom without regard to variation in track widths and wheel bases between different vehicles.

17. A wheel position measurement system as in claim 11 comprising means for conditioning said measured angle output to enhance angular resolution at smaller measured angles.

18. A wheel position measurement system as in claim 17 wherein said means for conditioning comprises a logarithmic amplifier for receiving said measured angle output and for providing increased resolution near the center of the angular range, and said means for receiving comprises inverse logarithmic means receiving said logarithmic amplifier output, whereby linearized measured angle output is obtained.

19. A wheel position measurement system as in claim 11 wherein said means for controlling comprises means for directing said angle measurement means to provide measurements of the angles between the planes of two pairs of diagonally opposite wheels, two pairs of same side wheels and two pairs of opposite wheels, whereby all toe angles are subject to calculation using different sets of angle measurements for comparison purposes.

20. Wheel alignment measurement apparatus for a vehicle having left and right front and left and right rear wheels having nominal wheel planes subject to alignment, comprising
first means for measuring the angle between the planes of the left front and right rear wheels,
second means for measuring the angle between the planes of the right front and left rear wheels,
third means for measuring the angle between the planes of the left front and right front wheels,
fourth means for measuring the angle between the planes of the left front and left rear wheels,
fifth means for measuring the angle between the planes of the right front and right rear wheels, and
processor means for receiving angle measurements from said first, second, third, fourth and fifth means for measuring and for providing output indicative of the relative orientations of the left and right front and left and right rear wheels.

21. Wheel alignment apparatus as in claim 20 comprising means coupled to said processor means for indicating front wheel offset.

22. Wheel alignment apparatus as in claim 20 comprising means coupled to said processor means for indicating front wheel setback.

23. Wheel alignment apparatus as in claim 20 comprising means coupled to said processor means for indicating rear wheel setback.

24. Wheel alignment apparatus as in claim 20 wherein said first, second, third, fourth and fifth means for measuring comprise two emitter-detector pairs each mounted on opposing ones of said wheels in optical communication therebetween.

25. Wheel alignment apparatus as in claim 20 wherein each of said first, second, third, fourth and fifth means for measuring comprise means mounted on each of said wheels for providing angle indicative output relative to the plane of each wheel, and taut band means extending between said means for providing angle indicative output.

26. Wheel alignment apparatus as in claim 20 comprising means for communicating track width of the vehicle to said processor means, whereby quantitative output indicative of vehicle relative wheel positions is provided.

27. Wheel alignment apparatus as in claim 20 comprising means for communicating wheel base data of the vehicle to said processor means, whereby quantitative output indicative of vehicle relative wheel positions is provided.

28. Wheel alignment apparatus as in claim 24 comprising variable gain amplifying means coupled to each of said detectors, said processor means comprising means for controlling said variable gain amplifying means to produce predetermined output therefrom without regard to variation in track widths and wheel bases between different vehicles.

29. Wheel alignment apparatus as in claim 20 comprising means for conditioning said angle measurements for enhancing angular resolution at small measured angles.

30. Wheel alignment measurement apparatus as in claim 20 comprising sixth means for measuring the angle between the planes of the left rear and right rear wheels, whereby any toe angle may be calculated using different sets of measured angles.

31. Apparatus for measuring the relative angular orientations and locations between the planes of supporting wheels on a four wheel vehicle, comprising
beam emitter means mounted on each supporting wheel for directing a beam therefrom toward one same side and one diagonally opposite wheel,
beam receiver means mounted on each supporting wheel in known orientation therewith for receiving said beam from one same side and one diagonally opposite wheel mounted beam emitter and for providing angle output indicative of angle between the beam receiver mounting wheel and each received beam,
cross beam emitter means mounted on each of a first two laterally opposed wheels,
cross beam receiver means mounted on each of said first two laterally opposed wheels in known orientation therewith for receiving said cross beam from said laterally opposed wheel mounted cross beam emitter and for providing angle output indicative of angle between the cross beam receiver mounting wheel and the received cross beam, and means for processing said angle outputs and for providing angular orientation and location data.

32. Apparatus as in claim 31 comprising means coupled to said means for processing for indicating front wheel offset.

33. Apparatus as in claim 31 comprising means coupled to said means for processing for indicating setback for a pair of laterally opposed wheels.

34. Apparatus as in claim 31 comprising means for communicating specified wheel separation data to said means for processing, whereby quantitative output indicative of relative wheel location is obtained.

35. Apparatus as in claim 31 comprising variable gain amplifying means coupled to each of said beam receiver and cross beam receiver means, said means for processing comprising means for controlling said variable gain amplifying means to produce useable output therefrom without regard to variation in wheel separation between different vehicles.

36. Apparatus as in claim 31 comprising means for conditioning said angle outputs for enhancing angular resolution at small measured angles.

37. Apparatus for measuring as in claim 31 comprising cross beam emitter means mounted on each of a second two laterally opposed wheels, cross beam receiver means mounted on each of said second two laterally opposed wheels in known orientation therewith for receiving said cross beam from said laterally opposed wheel mounted cross beam emitter and for providing angle output indicative of angle between the cross beam receiver mounting wheel and the received cross beam, whereby toe angle is subject to calculation using different sets of angle measurements.

38. A method of determining the relative orientation and location of supporting wheels on a four wheel vehicle, comprising the steps of measuring the angle between the planes of diagonally opposite pairs of wheels, measuring the angle between the planes of longitudinally opposed pairs of wheels, measuring the angle between the planes of one laterally opposed pair of wheels, and calculating the relative orientation and location of the four wheels from the measured angles.

39. The method of claim 38 comprising the step of indicating one laterally opposed wheel pair offset relative to the other laterally opposed wheel pair.

40. The method of claim 38 comprising the step of indicating setback for a pair of laterally opposed wheels.

41. The method of claim 38 wherein the step of calculating comprises the step of introducing specific wheel separation data, whereby quantitative output indicative of relative wheel location is obtained.

42. The method of claim 38 wherein the steps of measuring comprise the steps of providing outputs indicative of the measured angles, further comprising the steps of amplifying the outputs and varying the gain of the amplifying step to obtain amplified outputs at a useable level without regard to variation in wheel separation between different vehicles.

43. The method of claim 38 wherein the steps of measuring comprise the steps of providing outputs indicative of the measured angles, further comprising the step of enhancing the angular resolution of the outputs at small measured angles.

44. The method of claim 38 wherein the step of measuring the angle between planes of diagonally opposite wheels comprises the step of performing the measurement step underneath the vehicle.

45. The method of claim 38 wherein the steps of measuring comprise the steps of projecting a beam from one wheel and detecting the angle of beam impingement on the other wheel plane at the other wheel.

46. The method of claim 38 wherein the steps of measuring comprise the steps of extending a taut band between wheel pairs, and measuring the angles between the wheel plane and the taut band at each end thereof.

47. The method of claim 38 comprising the steps of measuring the angle between the planes of the other laterally opposed pair of wheels, and checking the accuracy of any calculated toe angle by comparison with a second calculation using different measured angles.

48. The method of claim 38 comprising the steps of assigning one wheel an arbitrary position value, assigning the direction between two of the supporting wheels an arbitrary direction value, and calculating the relative positions of the other three wheels.

49. Apparatus for measuring toe angles between the planes of the supporting wheels on a four wheel vehicle, comprising:

means for directly communicating between and for obtaining discrete data relating to angles between the planes of each wheel and the laterally and longitudinally adjacent and diagonally opposite wheels, and means for receiving data relating to any five of said angles and for calculating toe information for all four wheels.

50. Apparatus as in claim 49 comprising means for receiving data relating to any four of said five angles and to a sixth angle, whereby a check calculation is made for said toe information.

51. Apparatus as in claim 49 comprising means for receiving data relating to a sixth angle, whereby said toe information calculation for two of the four wheels is checked by direct measurement.

52. Apparatus as in claim 49, comprising means for obtaining data relating to the angle between the planes of the front wheels.

53. Apparatus as in claim 49, comprising means for obtaining data relating to the angle between the planes of the rear wheels.

* * * * *